United States Patent [19]
Reedy

[11] 3,822,002
[45] July 2, 1974

[54] UNIBLOCK LUBRICATOR
[76] Inventor: Elvie L. Reedy, 3617 London Ln., Fort Worth, Tex. 76118
[22] Filed: Dec. 8, 1972
[21] Appl. No.: 313,486

[52] U.S. Cl............ 184/45 R, 137/412, 184/103 R, 222/136
[51] Int. Cl....................... F16n 11/04, F16n 29/02
[58] Field of Search............ 184/103 R, 45 R, 45 A, 184/81, 7 R; 222/76, 67, 132, 136, 255, 145, 135, 181; 137/412, 597, 594, 595; 251/62

[56] References Cited
UNITED STATES PATENTS

| | | | |
|---|---|---|---|
| 1,805,290 | 5/1931 | MacIndoe............................ | 184/103 |
| 2,120,048 | 6/1938 | Turner................................. | 137/412 |
| 2,498,090 | 2/1950 | MacIndoe............................ | 184/45 R |
| 2,790,459 | 4/1957 | Thomas.............................. | 137/412 |
| 3,481,431 | 12/1969 | Dorsey............................... | 184/7 E |
| 3,498,413 | 3/1970 | Krieger............................... | 184/45 R |
| 3,501,057 | 3/1970 | Binnings............................. | 222/136 X |
| 3,606,242 | 9/1971 | Lathrop.............................. | 251/62 |

Primary Examiner—Manuel A. Antonakas
Attorney, Agent, or Firm—Richards, Harris & Medlock

[57] ABSTRACT

A lubricating apparatus having a cylindrical chamber with an axially movable piston therein. This piston is resiliently biased or driven by a compression spring to compress lubricant in the chamber. This chamber is provided with lubricant supply and output ports. Conduit means are attached between the lubricant output ports and the object to be lubricated. Conduit means are also attached between the lubricant input port and a supply of pressurized lubricant. Solenoid valve means are provided in the input conduit to selectively supply pressurized lubricant to said chamber. Natural magnets are mounted on said piston while a magnetically-responsive reed switch is positioned in said chamber. This switch is operated by the movement of the piston and is connected to the solenoid valve means to open the valve when the piston moves to a predetermined position. In a second embodiment, a plurality of chambers is formed in a resiliently-molded mounting block. Mounting means independent of conduits are provided for the blocks.

19 Claims, 5 Drawing Figures

UNIBLOCK LUBRICATOR

BACKGROUND AND SUMMARY OF THE INVENTION

The present invention relates generally to improvements in lubricating apparatus, and the like. More particularly a new and improved lubricating apparatus is disclosed which supplies pressurized lubricant and is automatically refilled as the lubricant is utilized from the device. In the field of maintenance of apparatus requiring lubrication, it has been the general practice to employ workmen or maintenance engineers to periodically inject a lubricant through the suitable fittings to the bearings of the apparatus. During this injection operation, it is not unusual for lint or other abrasive materials to be mixed with the lubricant as the connection is made as well as for considerable amounts of lubricant to be forced out of the bearing and wasted, as the only effective lubricant is that which covers the bearing surfaces. Since, in a reasonably well-fitted bearing the amount of grease retained thereon amounts to a very small film which will soon be dissipated, the bearing must be frequently serviced to provide proper lubrication of the bearings.

The general purpose of this invention is the provision of an improved lubricating apparatus which continually supplies pressurized lubricant as required to a bearing, or the like, thus eliminating the necessity of periodic maintenance. To attain this, the present invention contemplates the use of an improved lubricant dispensing chamber which utilizes a transparent cylinder for viewing the lubricant therein, and wherein a spring-loaded piston is provided in the cylinder to supply pressurized lubricant to a bearing, or the like and wherein the cylinder is automatically refilled as the lubricant is exhausted from the chamber.

An object of the present invention is the provision of an improved lubricating apparatus.

Another object of the present invention is to provide an improved lubricating apparatus which supplies pressurized lubricant to a bearing, or the like.

A further object of the present invention is the provision of an improved lubricating apparatus which automatically refills a lubricant dispensing chamber.

Still another object of the present invention is the provision of an improved mounting configuration for a plurality of these lubricant dispensing chambers.

Yet another object of the present invention is the provision of an improved lubricating apparatus which is simple and inexpensive to manufacture, install and service.

Other objects and many intended advantages of the invention will be readily appreciated by those of ordinary skill in the art, as the same becomes better understood by reference to the following Detailed Description when considered in connection with the accompanying Drawings in which:

DETAILED DESCRIPTION OF THE DRAWINGS

Figure 1:
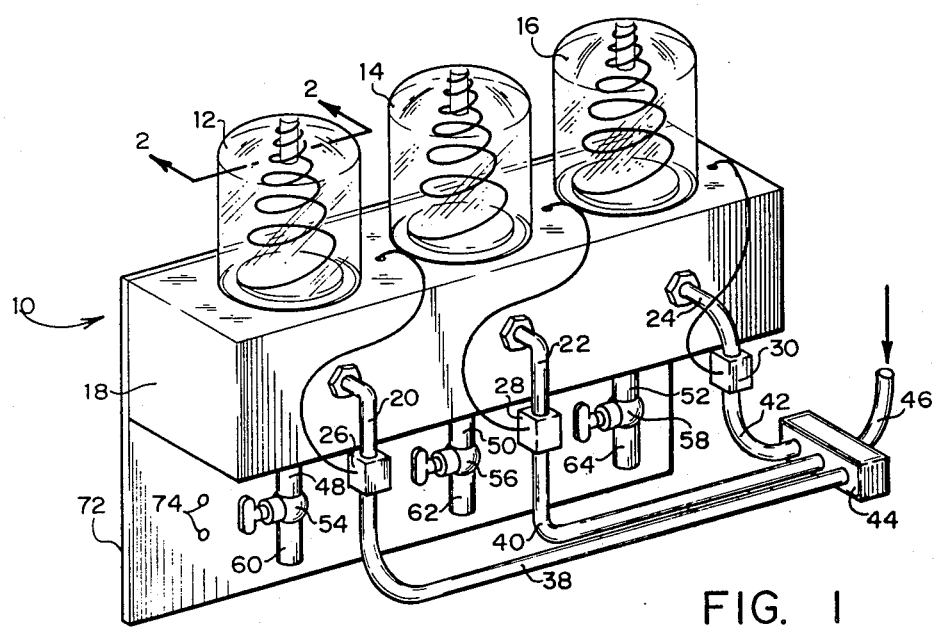
FIG. 1 illustrates a front perspective view of the improved lubricating apparatus of the present invention.

Referring now to the Drawings, wherein like reference characters designate like or corresponding parts throughout the several views, there is shown in FIG. 1, a lubricating apparatus assembly which for purposes of description is designated by reference numeral 10. This lubricating apparatus assembly is utilized in situations where it is desirable to continuously provide a flow of lubricant to a bearing, or the like. This lubricating apparatus assembly 10 is provided with three separate lubricating apparatus 12, 14, and 16. For purposes of description the assembly 10 is illustrated with three apparatus thereon, but it is to be understood, of course, that more or less apparatus could be provided as required for each particular use. As will be hereinafter described in detail, each of the lubricating apparatus 12 is provided with a chamber therein for receiving a quantity of lubricant. Each of the chambers of the lubricating apparatus 12, 14 and 16 is provided with a lubricant input port which extends laterally through the resiliently molded mounting block 18. Lubricant supply lines 20, 22 and 24 have one end attached, respectively, to the lubricant input ports of the chambers of lubricating apparatus 12, 14 and 16, while the other end is attached, respectively, to valves 26, 28 and 30. These valves 26, 28 and 30 are commercially available electrically controlled solenoid valves which are well-known in the art. These valves 26, 28 and 30 are connected by conduits 38, 40 and 42, respectively, to a lubricant supply manifold 44. This lubricant supply manifold 44 is in turn connected to a pressurized supply of lubricant through conduit 46. This manifold 44 is so constructed that each of the conduits 38, 40 and 42 is commonly connected to the lubricant supply 47 through conduit 46.

Each of the chambers of lubricant apparatus 12, 14 and 16 is provided with a downwardly extending orificed lubricant output port, each of which extends through the block 18. These lubricant output ports of the chambers of the lubricating apparatus 12, 14 and 16 are attached, respectively, to conduits 48, 50 and 52. The conduits 48, 50 and 52 are connected, respectively, to valves 54, 56 and 58. These valves 54, 56 and 58 are the ball valve type and are manually operable to control the flow of lubricant, respectively, through conduits 48, 50 and 52. Conduits 60, 62 and 64 connect the valves 54, 56 and 58, respectively, to bearing assemblies 66, 68 and 70, respectively.

Attached to one side of the block 18 is a mounting bracket 72, which is provided with a plurality of suitable openings 74 for insertion of fasteners, or the like, to attach the lubricating apparatus assembly adjacent to the apparatus to be lubricated.

Figure 2:
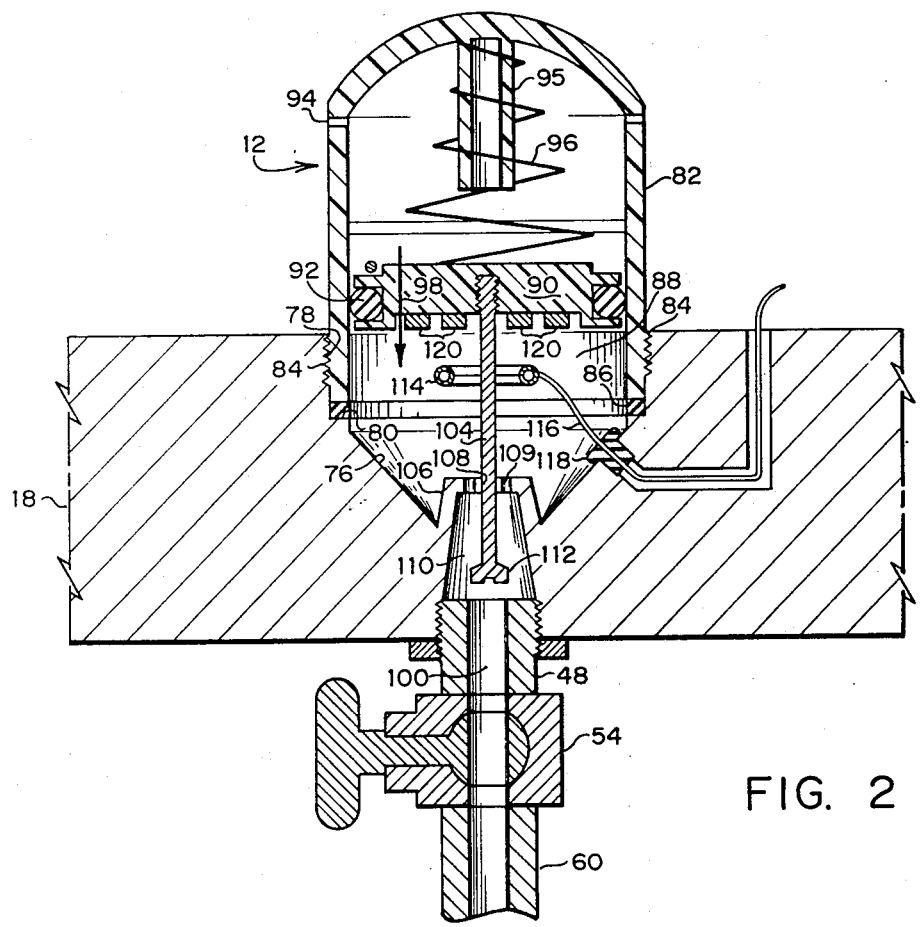
FIG. 2 illustrates a section of the device taken on line 2—2 of FIG. 1 looking in the direction of the arrows.

Turning now in particular to FIG. 2, the details of the internal structure of the lubricating apparatus 12 will be disclosed. It is important to note at this point that the lubricating apparatus 12 is typical of the structure of the apparatus 14 and 16 and that even though three apparatus are shown in each mounting block 18, it is envisioned that more or less could be provided as is required by the particular apparatus to be lubricated. The block 18 is provided with a conical well 76, which has an internally threaded portion 78, adjacent to the diverging end of the well. An annular shoulder 80 is positioned at the lower extremity of the threaded portion 78 for use in sealing the cover as well be hereinafter described. A dome-shaped cap or cover 82 is constructed from transparent material, such as plastic, or the like, and is provided with an external male-threaded portion 84, which engages the threaded portion 78 to attach the cap 82 to the block 18. An annular gasket 86 of compressible material is compressed between the end of the cap 82 and the annular shoulder 80, to provide a seal therebetween. The cap 82 is provided with a cylindrical chamber 88 therein, which in conjunction with the conical well defines the lubricant storage volume. A pistion 90 with suitable packing 92 is mounted to contact the interior of the cylindrical chamber in a sliding sealing arrangement so that the piston 90 can axially reciprocate in the cylindrical chamber 88. Suitable vents 94 are provided in the upper portion of the cap 82 for allowing air to escape from the interior of the cap as the piston axially reciprocates in the chamber 88. A stop 94 is positioned in the upper portion of the cap 82 and extends axially down into the cap. A compression spring 96 is centered on the stop 95 and extends between the piston 90 and upper portion of the cap 82 to resiliently urge the piston to move in the direction of arrow 98. The lubricant outlet port 100 is shown extending axially from the conical well 76 and is connected to the conduit 48 through suitable tube fittings. The lubricant supply port is not shown but it is to be understood that the port extends between the exterior of the block 18 and the interior of the conical well 76, so that lubricant can be injected into the well below the piston 90.

Centrally attached to the piston 90 is a piston guide rod 104, which extends axially through the well 76. A guide frame 106 is positioned in the lower portion of the well 76 and is provided with a clearance bore 108 of a size to allow the guide rod to axially slide therethrough. A plurality of orifices 109 is provided in the frame 106 and each orifice is of such a size to assist in controlling the flow of lubricant from the chamber 88. A valve chamber 110 is positioned below the guide frame 106 and is connected to the lubricant outlet port 100. This valve chamber 110 diverges in cross sectional area as a chamber extends in a downward direction. A valve 112 is attached to the guide rod 104 and is axially moved by the piston 90.

Thus it can be seen that when the piston is moved in the reverse direction of arrow 98, the spring 96 will be compressed, thus increasing the amount of force exerted by the piston on the lubricant trapped below the piston. As lubricant is depleted from below the piston by exiting through the lubricant outlet port 100, the spring will cause the piston to move in the direction of arrow 98, thus reducing the force exerted by the spring on the piston and in turn reducing the pressure of the lubricant remaining below the piston. The valve 112 is present to compensate for this difference in force created by the variations in deflection of the spring 96. It can be seen that when the piston is in the upper position wherein the spring exerts the maximum force, the valve will be positioned in the narrower portion of the valve chamber 110, thus reducing the flow area between the valve and the walls of the valve chamber. As the spring extends and the force decreases, the valve will be moved downward into the chamber 110, thus increasing the effective flow area between the valve 112 and the wall of the chamber 110. In this manner the valve assists in stabilizing the amount of lubricant supplied to the object to be lubricated.

A reed switch 114 is mounted within the lower portion of the well 76 by suitable means such as adhesively attaching the same to the walls of the well. This switch 114 is electrically connected by cables 116 to a power supply and the coil 124 of the solenoid valve 26. A suitable gasket 118 is provided to prevent a loss of lubricant though the channel provided for the cables 116.

A plurality of natural magnets 120 is mounted on the lower portion of the piston 90. These magnets 120 are so positioned on the piston that when the fluid is depleted from the chamber 88 to a minimal amount, the magnets will be carried to a position in the proximity of the switch 114, and will operate the switch 114 to energize the valve 26 which in turn will allow pressurized lubricant to enter the lubricant chamber. The valve 26 is of the type which will remain open for a short period after being energized to refill the lubricant chamber even though the switch 114 is subsequently opened.

Figure 3:
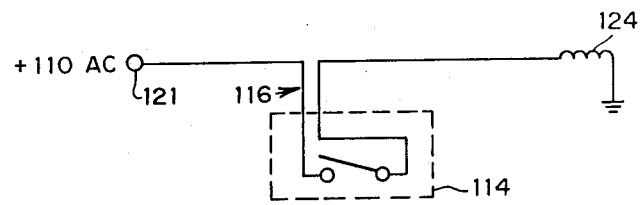
FIG. 3 illustrates a schematic wiring diagram of the improved lubricating apparatus of the present invention.
Figure 4:
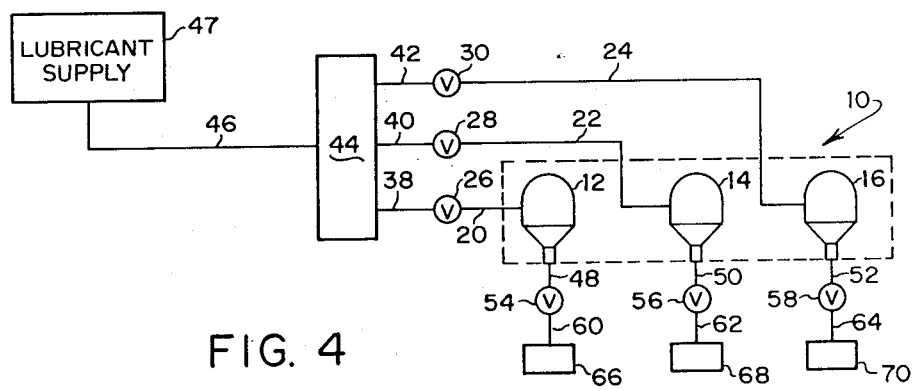
FIG. 4 is a tubing layout for the lubricant conduits of the present invention.

A schematic diagram of the wiring configuration of the reed switch 114 and a valve 26 is shown in FIG. 3. Reed switch 114 has one terminal attached to a 110 volt AC power supply 121 and the other terminal attached to one side of the coil 124 of the solenoid valve 26. The other side of the coil 124 is connected to ground 116. Thus when the magnet moves into the proximity of the switch 114, the switch will close supplying power to the coil 124 which in turn opens the valve 26 and allows pressurized lubricant to flow from lubricant supply 47 through input line 20.

Thus it can be seen that the lubricant can be periodically resupplied to the lubricating apparatus as it is utilized.

Figure 5:
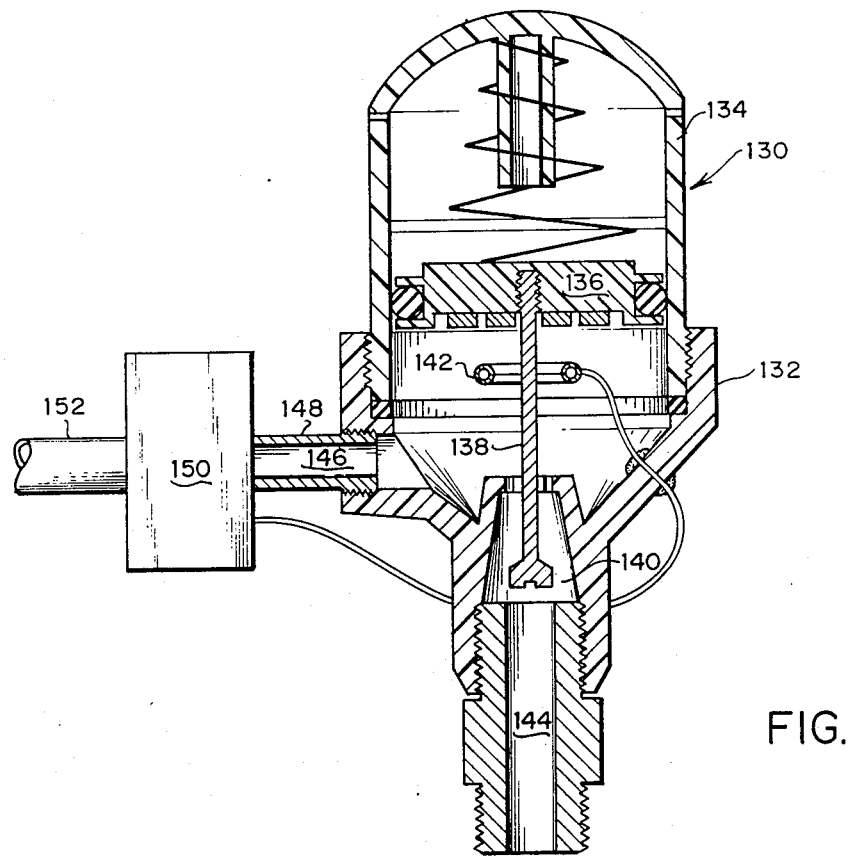
FIG. 5 is a view similar to FIG. 2 of an anlternative embodiment of the present invention.

An alternate embodiment of the lubricating apparatus is shown in FIG. 5. This second configuration 130 is identical in structure to the apparatus shown in FIGS. 1 through 4, except that the conical well 76 in the block 18 has a conical-shaped base 132 substituted therefor. This second configuration 130 is provided with a cap 134, piston 136, guide rod 138, valve chamber 140 and reed switch assembly 142, which are identical in structure to the elements 82, 90, 104, 110 and 114, respectively, of the previously-described embodiment. A lubricant output port 144 is provided in the bottom of the base 132 while a lubricant input port 146 extends laterally into the base as shown. A conduit 148 is connected to the lubricant input port 146 and a valve 150 controls a flow of lubricant through the conduit 148. This valve 150 is in turn connected to a conduit 152, which supplies pressurized lubricant to the valve. The valve 150 is connected to the reed switch assembly 142 as described with respect to the previous embodiment and is operated in response to the depletion of lubricant from the apparatus. Thus the second embodiment of the lubricant apparatus 130 operates in the same manner as described with respect to the previous embodiment.

It should be understood, of course, that the foregoing disclosure relates to only a preferred embodiment of the invention, and that numerous modifications or alterations may be made therein by those of ordinary skill In the claims:

1. An apparatus for supplying lubricant at a constant rate to an object comprising:
   a housing having a cylindrical walled chamber formed therein, said chamber being closed at both ends;
   a piston mounted to axially reciprocate in said chamber said piston engaging the interior wall of siad chamber in sliding sealing contact, said piston dividing said chamber into first and second volumes;
   bias means applying a resilient force on said piston to urge said piston to move in a first axial direction in said chamber to decrease the size of said first volume and to increase the size of said second volume;
   lubricant supply means having a solenoid valve connected to said first volume for selectively supplying pressurized lubricant to said first volume;
   conduit means interconnecting said first volume and the object to be lubricated to supply lubricant to the object; and
   switch means enclosed within said first volume sensing the quantity of lubricant in said first volume, said sensing means being electrically connected to said solenoid valve for supplying lubricant to said first volume when the lubricant in said first volume falls below a set quantity.

2. An apparatus as defined in claim 1 wherein said lubricant supply means additionally comprises:
   a tank containing a volume of pressurized lubricant; and
   conduit means interconnecting said tank and said solenoid valve.

3. An apparatus as defined in claim 3 wherein said switch means is operatively associated with said piston and being operatively associated with said piston to operate said valve in response to the position of said piston.

4. An apparatus as defined in claim 3 wherein said switch means comprises a magnetic reed switch and wherein at least one natural magnet is mounted on said piston to operate said switch when said piston is in a predetermined position.

5. A system for supplying lubricant at a constant rate to an object comprising in combination:
   a lubricating apparatus comprising a housing having a cylindrical walled chamber therein, a piston mounted to axially reciprocate in said chamber, said piston engaging the interior wall of said chamber in sliding sealing contact, said piston dividing said chamber into a first and second volume, biasing means applying a resilient force to urge volume, biasing means applying a resilient force to urge said piston to move in a first axial direction in said chamber to decrease the size of said first volume and increase the size of said second volume, conduit means interconnecting said first volume and said object to be lubricated;
   a lubricant supply means comprising a storage chamber containing a volume of lubricant under pressure, conduit means interconnecting said storage chamber and said first volume, electrically operable valve means for controlling the flow of lubricant from said storage chamber through said conduit to said first volume; and
   switch means located in said first volume and operatively associated with said valve for sensing the quantity of lubricant in said first volume and for operating said valve means whereby the quantity of lubricant in said first chamber is controlled.

6. A system as defined in claim 5 wherein said storage chamber comprises a tank.

7. A system as defined in claim 6 wherein said switch means is operatively associated with said piston to operate said valve in response to the position of said piston.

8. A system as defined in claim 7 wherein said switch means comprises a magnetic reed switch; and wherein at least one magnet is mounted on said piston to operate said switch means when said piston is in a predetermined position.

9. A system for supplying lubricant at a constant rate to an object comprising in combination:
   a lubricating apparatus comprising a housing having a cylindrical walled chamber therein, a piston mounted to axially reciprocate in said chamber, said piston engaging the interior wall of said chamber in sliding sealing contact, said piston dividing said chamber into a first and second volume, biasing means applying a resilient force to urge said piston to move in a first axial direction in said chamber to decrease the size of said first volume and increase the size of said second volume; conduit means interconnecting said first volume and said object to be lubricated;
   a lubricant supply means comprising a storage chamber containing a volume of pressurized lubricant, conduit means interconnecting said storage chamber and said first volume, electrically operable valve means for controlling the flow of lubricant from said storage chamber through said conduit to said first volume; and
   the improvement which comprises switch means located in said first volume operatively associated with said valve means for sensing the quantity of lubricant in said first volume and for operating said valve means whereby the quantity of lubricant in said first chamber is controlled.

10. A system as defined in claim 9 wherein said storage chamber comprises a tank.

11. A system as defined in claim 10 wherein said switch means is operatively associated with said piston to operate said valve in response to the position of said piston.

12. A system as defined in claim 11 wherein said switch means comprises a magnetic reed switch and wherein at least one magnet is mounted on said piston to operate said switch when said piston is in a predetermined position.

13. A shield mount with upstanding forced lubricant control units having a piston and guide rod with a valve thereon comprising:
   a resilient molded parallelpipe-shaped block having a plurality of conical walls extending downward therein from the top thereof and in which said units are positioned;
   said block having first ports through the bottom thereof axially extending from said wells;
   an inverted top fixed in the bottom of each well, each of said cups having a centrally located clearance bore of a size to receive a guide rod therein and radially spaced flow control passageways extending through said cup;
a lubricant output line extending from each unit through said ports and through which lubricant flows from said unit;
said block having second ports all laterally extending from one side wall of said block to each of said wells;
a lubricant supply line extending to each lateral port and through which lubricant flows to each said unit; and
means for mounting said block for support independent of said lines.

14. An apparatus for independently lubricating a plurality of objects comprising:
a housing having a plurality of conical wells therein extending downward therein from the top thereof; each of said wells having first ports extending axially from the bottom of said wells through said housing; each of said wells having second ports extending laterally from one side wall of said housing to each of said wells;
means for mounting said housing for support;
a plurality of separate lubricant output lines connecting each of said first ports to separate objects;
a plurality of separate lubricant supply lines each connect to separate second ports;
separate cap means having cylindrical chambers formed therein connected to each of said wells, said cap means being constructed from transparent material;
a plurality piston means, one of said piston means mounted to axially reciprocate in each of said cylindrical chambers, each of said pistons engaging the walls of one of said chambers in sliding sealing contact, each of said pistons, said cylindrical chamber walls and said conical wells defining a lubricant storage volume, a guide rod extending axially down from said piston and through the bottom of said well, a valve mounted on the end of said guide rod;
separate biasing means applying a resilient force to each of said pistons to urge said pistons to move axially in said cylinders in a direction to compress said lubricant in said storage volume; and
an inverted cup fixed in the bottom of each well, each cup having a centrally located clearance bore of a size to receive said guide rod therethrough and radially spaced flow control passageways extending through said cup and cooperating with said valve to selectively restrict flow of lubricant from said lubricant storage volume when said storage volume is full of lubricant.

15. An apparatus as defined in claim 14 additionally comprising a tank containing a volume of pressurized lubricant, said tank being connected to each of said lubricant supply lines and valve means on each lubricant supply line for selectively controlling the flow of lubricant from said tank through said lubricant supply lines and to said lubricant storage volume.

16. An apparatus as defined in claim 15 additionally comprising switch means in said lubricant storage volume operatively associated with each of said wells for sensing the quantity of lubricant in said lubricant storage volume and for operating said valve to supply lubricant to said lubricant storage volume when the lubricant in said lubricant storage volume falls below a set quantity.

17. An apparatus as defined in claim 16 wherein each of said valve means is an electrically controlled solenoid valve.

18. An apparatus as defined in claim 17 wherein each of said sensing means comprises a switch which is electrically connected to one of said valve means, each of said switch means being operatively associated with said one of said pistons to operate one of said valves in response to the position of one of said pistons.

19. An apparatus as defined in claim 18 wherein each of said switches comprises a magnetic reed switch and wherein at least one magnet is mounted on each of said pistons to operate one of said switches when said one of said pistons is in a predetermined position.

* * * * *

PO-1050
(5/69)

UNITED STATES PATENT OFFICE
CERTIFICATE OF CORRECTION

Patent No. __3,822,002__  Dated __July 2, 1974__

Inventor(s) __Elvie L. Reedy__

It is certified that error appears in the above-identified patent and that said Letters Patent are hereby corrected as shown below:

Col. 2, line 3, "anlternative" should be --alternative--.
Col. 3, line 4, "weill" should be --will--;
      line 22, "stop 94" should be --stop 95--.
Col. 5, line 10, "siad" (second occurrence) should be --said--;
      line 38, "3" should be --2--;
      lines 55 and 56, "biasing means...volume," should be
         deleted.
Col. 6, line 4, after "valve" insert --means--;
      line 66, "top" should be --cup--.
Col. 7, line 28, "connect" should be --connected--.

Signed and sealed this 15th day of October 1974.

(SEAL)
Attest:

McCOY M. GIBSON JR.                   C. MARSHALL DANN
Attesting Officer                      Commissioner of Patents